(12) United States Patent
Gonzalez et al.

(10) Patent No.: US 6,382,735 B2
(45) Date of Patent: May 7, 2002

(54) FULL FACE VEHICLE WHEEL AND METHOD FOR PRODUCING SAME

(75) Inventors: Alexander Gonzalez, Valencia (VE); George Kengle, Monroe, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/871,715

(22) Filed: Jun. 1, 2001

Related U.S. Application Data (63) Continuation of application No. PCT/US99/30165, filed on Dec. 17, 1999.
(60) Provisional application No. 60/114,023, filed on Dec. 29, 1998.

(51) Int. Cl.$^7$ ................................................. B60B 3/10
(52) U.S. Cl. .............................. 301/63.104; 301/63.105
(58) Field of Search ................... 301/63.101, 63.103, 301/63.104, 63.105, 63.106

(56) References Cited

U.S. PATENT DOCUMENTS

| | | | |
|---|---|---|---|
| 4,610,482 A | | 9/1986 | Overbeck et al. |
| 5,188,429 A | * | 2/1993 | Heck et al. ................ 301/63.1 |
| 5,435,632 A | * | 7/1995 | Gajor et al. ............... 301/63.1 |
| 5,435,633 A | | 7/1995 | Jaskierny |
| 5,509,726 A | * | 4/1996 | Overbeck ................... 301/63.1 |
| 5,515,709 A | | 5/1996 | Lowe et al. |
| 5,517,759 A | | 5/1996 | Hill et al. |
| 5,533,261 A | | 7/1996 | Kemmerer |
| 5,639,147 A | | 6/1997 | Hill et al. |
| 6,030,051 A | * | 2/2000 | Hosoda et al. ............. 301/63.1 |
| 6,213,563 B1 | * | 4/2001 | Heck et al. ................ 301/63.1 |

* cited by examiner

Primary Examiner—S. Joseph Morano
Assistant Examiner—Long Bao Nguyen
(74) Attorney, Agent, or Firm—MacMillan, Sobanski & Todd, LLC (57) ABSTRACT

This invention relates to a full face vehicle wheel including a wheel rim joined to a wheel disc. The disc includes a body having a wheel mounting surface and an outer annular portion which defines an outboard tire bead seat retaining flange of the wheel. The outer annular portion includes an outer surface and an inner surface. The outer surface defines a radially extending outer surface in the region of the outboard tire bead seat retaining flange, and the inner surface defines a radially extending inner fit up surface. The outer annular portion further includes a non-radially extending inner surface spaced directly inwardly of the inner fit up surface. The rim defines an axis and includes an inboard tire bead seat retaining flange, an inboard tire bead seat, an axially extending well, and an outboard tire bead seat which terminates at an extruded inturned flange. The inturned flange includes a radially inwardly extending first outer surface, a non-radially extending second outer surface, an inner surface, and an endmost surface. The radially inwardly extending first outer surface defines an outer control surface. When the outer control surface of the rim is positioned adjacent the inner fit up surface of the disc and the rim and disc joined together by the weld, the non-radially extending second outer surface of the inturned flange contacts at least a portion of the non-radially extending inner surface of said disc to reduce a radial distance of the radially extending outer surface of the disc in the region of the outboard tire bead seat retaining flange.

20 Claims, 11 Drawing Sheets

FULL FACE VEHICLE WHEEL AND METHOD FOR PRODUCING SAME

This Appln is a cont of PCT/US99/30165 filed Dec. 17, 1999 and claims benefit of Prov. No. 60/114,023 filed Dec. 29, 1998.

BACKGROUND OF THE INVENTION

This invention relates in general to vehicle wheels and in particular to an improved full face vehicle wheel and method for producing the same.

A conventional vehicle wheel is typically of a two-piece construction and includes an inner wheel disc and an outer "full" wheel rim. The wheel disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The wheel rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is secured to the wheel rim by welding.

A full face vehicle wheel is distinguished from other types of vehicle wheels by having a one-piece wheel disc construction. In particular, the full face wheel includes a "full face" wheel disc and a "partial" wheel rim. The full face wheel disc can be cast, forged, or fabricated from steel, aluminum, or other alloys. The full face wheel disc includes an inner annular wheel mounting portion and an outer annular portion which defines at least a portion of an outboard tire bead seat retaining flange of the vehicle wheel. The wheel mounting portion defines an inboard mounting surface and includes a center pilot or hub hole, and a plurality of lug receiving holes formed therethrough for mounting the vehicle wheel to an axle of the vehicle. The partial wheel rim is fabricated from steel, aluminum, or other alloys, and includes an inboard tire bead seat retaining flange, an inboard tire bead seat, an axially extending well, and an outboard tire bead seat. In some instances, the outboard tire bead seat of the wheel rim and the outer annular portion of the wheel disc cooperate to form the outboard tire bead seat retaining flange of the full face vehicle wheel. In both types of constructions, the outboard tire bead seat of the wheel rim is positioned adjacent the outer annular portion of the wheel disc and a weld is applied to secure the wheel rim and the wheel disc together.

SUMMARY OF THE INVENTION

This invention relates to an improved full face vehicle wheel having a wheel rim joined to a wheel disc. The wheel disc includes a body having a centrally located wheel mounting surface and an outer annular portion. The outer annular portion of the wheel disc defines an outboard tire bead seat retaining flange of the full face vehicle wheel. The outer annular portion of the wheel disc includes an outer surface and an inner surface. The outer surface of the outer annular portion defines a generally radially extending outer surface in the region of the outboard tire bead seat retaining flange. The inner surface of the outer annular portion defines a generally radially extending inner fit up surface. The outer annular portion of the wheel disc further includes a generally non-radially extending inner surface spaced directly inwardly of the radially extending inner fit up surface. The wheel rim defines an axis and includes an inboard tire bead seat retaining flange, an inboard tire bead seat, an axially extending well, and an outboard tire bead seat. The outboard tire bead seat of the wheel rim terminates at an extruded inturned flange. The extruded inturned flange includes a generally radially inwardly extending first outer surface, a generally non-radially extending second outer surface, an inner surface, and an endmost surface. The radially inwardly extending first outer surface of the extruded inturned flange defines an outer control surface. When the outer control surface of the wheel rim is positioned adjacent the inner fit up surface of the wheel disc and the wheel rim and the wheel disc joined together by a weld, the non-radially extending second outer surface of the extruded inturned flange contacts at least a portion of the non-radially extending inner surface of the wheel disc thereby reducing a radial distance of the radially extending outer surface of the wheel disc in the region of the outboard tire bead seat retaining flange.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
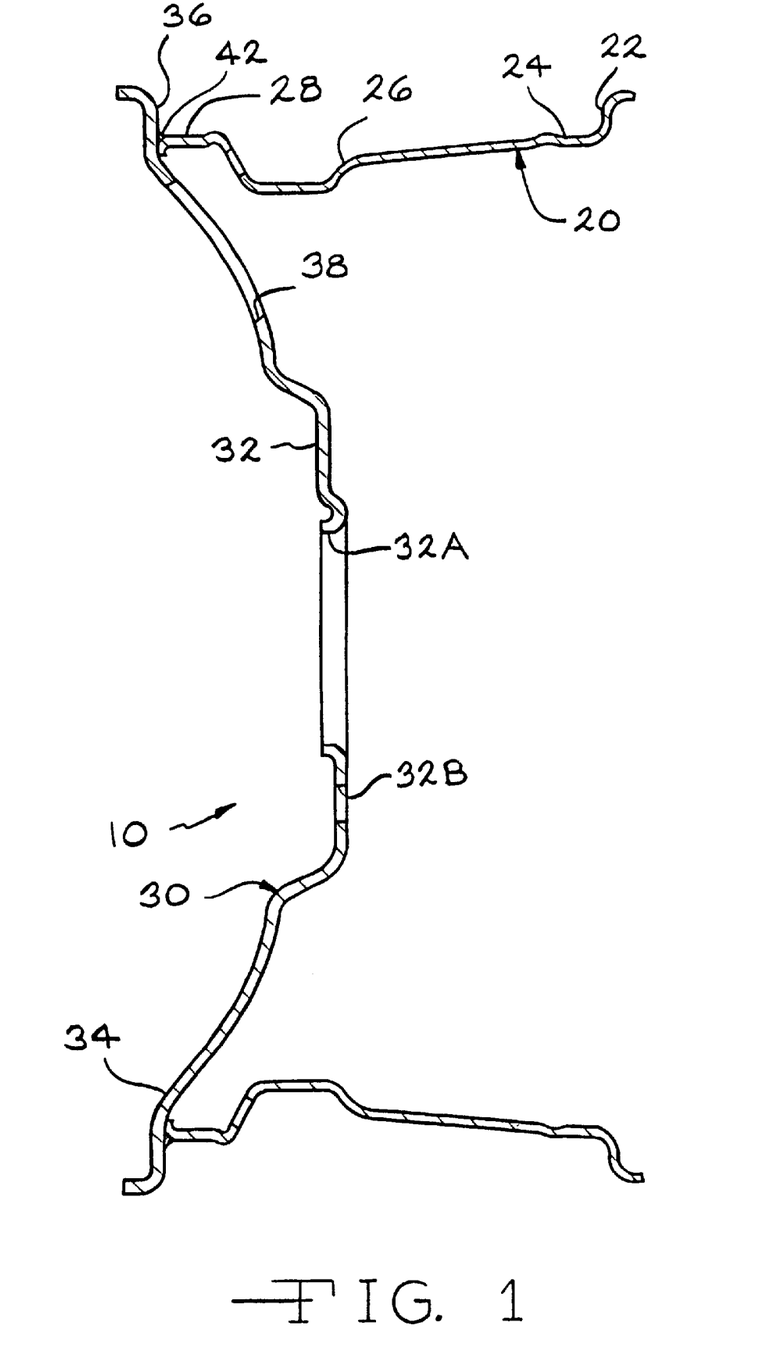
FIG. 1 is a cross-sectional view of a full face vehicle wheel constructed in accordance with the present invention.

Referring now to the drawings, there is illustrated in FIG. 1 a vehicle wheel, indicated generally at 10, produced in accordance with the present invention. The vehicle wheel 10 produced according to this invention is illustrated as being a full face fabricated vehicle wheel. The full face vehicle wheel 10 includes a partial wheel rim 20 and a full face wheel disc 30 which are joined together by a weld 42 during a welding operation.

The wheel rim 20 is a fabricated rim formed from a suitable material, such as for example, steel, aluminum or alloys thereof, magnesium, or titanium. The wheel rim 20 includes an inboard tire bead seat retaining flange 22, an inboard tire bead seat 24, a generally axially extending well 26, and an outboard tire bead seat 28.

Figure 4:
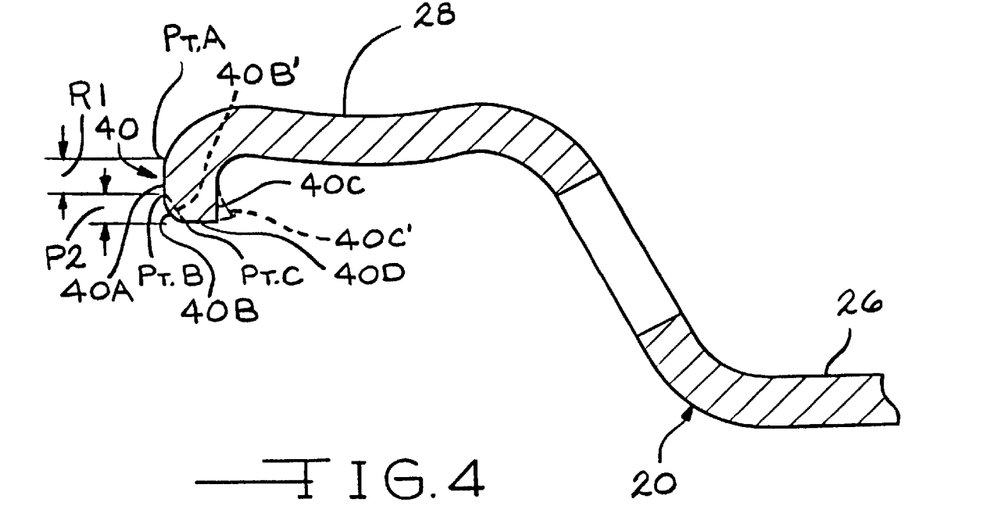
FIG. 4 is a cross-sectional view of a portion of the wheel rim illustrated in FIGS. 1–3.
Figure 5:
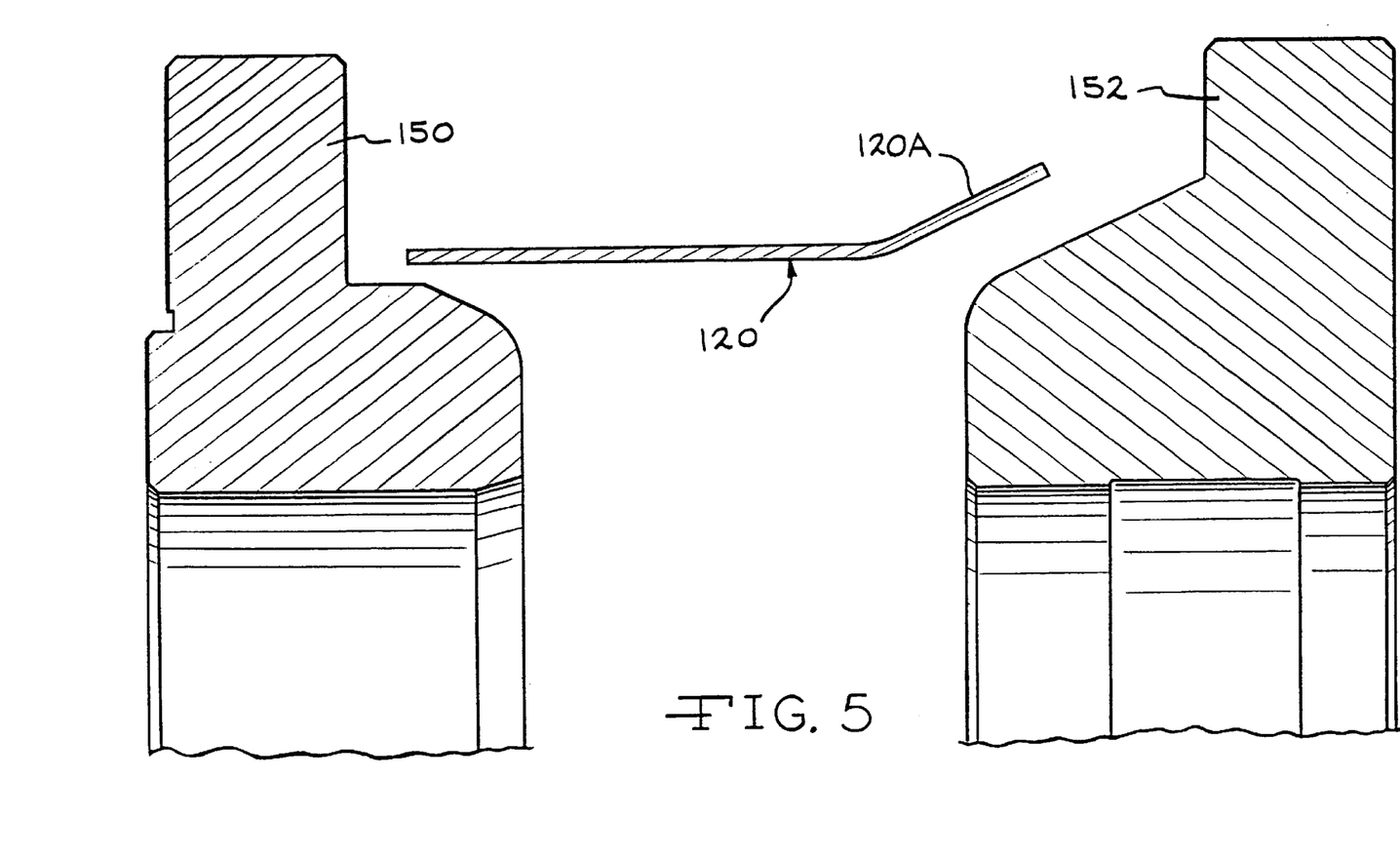
FIG. 5 is a cross sectional view showing an initial flare operation of the disc blank for use in producing the wheel rim illustrated in FIGS. 1–4 in accordance with the present invention.

As best shown in FIG. 4, the outboard tire bead seat 28 of the wheel rim 20 of the present invention includes an extruded radially extending inturned flange, indicated generally at 40. The inturned flange 40 includes a generally flat radially inwardly extending first outer surface 40A, a generally non-radially extending second outer surface 40B, a generally flat radially inwardly extending inner surface 40C, and a generally flat axially extending endmost surface 40D. As will be discussed below, in accordance with the present invention the flange 40 and in particular the radially inwardly extending first outer surface 40A and the non-radially extending second outer surface 40B of the flange 40 are formed by a metal forming process, such as the metal forming process shown in FIGS. 5–9.

As shown in this embodiment, the second outer surface 40B is slightly rounded to define a generally curved or non-flat second outer surface; however, depending upon the particular application, the second outer surface 40B could resemble a generally flat, angled or chamfered outer surface as shown in phantom at 40B' in FIG. 4. Preferably, the inturned flange 40 is entirely formed by the metal forming process described below in detail; however, in some instances, it may be necessary to slightly machine of one or more of the surfaces 40A, 40B, 40C, and 40D of the flange 40. Also, as will be discussed below, the radially inwardly extending first outer surface 40A defines a generally flat outer control surface for positioning the wheel rim 20 relative to the wheel disc 30. Alternatively, the first outer surface 40A could be slightly rounded (not shown).

As best shown in FIG. 4, the radially inwardly extending first outer surface 40A extends from a point A to a point B to define a radial distance R1, and the non-radially extending second outer surface 40B extends from the Point B to the point C to define a radial distance R2. As will be discussed below, the non-radially extending curled second outer surface 40B is formed during a metal forming operation to predetermined tolerances. In the illustrated embodiment, the radial distances R1 is slightly greater than the radial distance R2; however, depending upon the particular wheel structure, the radial distances R1 and R2 can be generally equal to one another or the radial distance R1 can be less than the radial distance R2.

The wheel disc 30 is forged, cast, fabricated, or otherwise formed from a suitable material, such as for example, steel, aluminum or alloys thereof, steel, magnesium, or titanium. The wheel disc 30 includes a generally centrally located wheel mounting surface 32 and an outer annular portion 34. The wheel mounting surface 32 is provided with a centrally located pilot aperture 32A and a plurality of lug bolt receiving holes 32B circumferentially spaced around the pilot aperture 32A. The lug bolt receiving holes 32B receive lug bolts (not shown) and nuts (not shown) for securing the vehicle wheel 10 on an axle (not shown) of a vehicle. The outer annular portion 34 of the wheel disc 30 defines an inboard tire bead seat retaining flange 36 of the vehicle wheel 10. The wheel disc 30 may also include a plurality of decorative openings or windows 38 (only one of such decorative openings 38 illustrated in FIG. 1).

Figure 2:
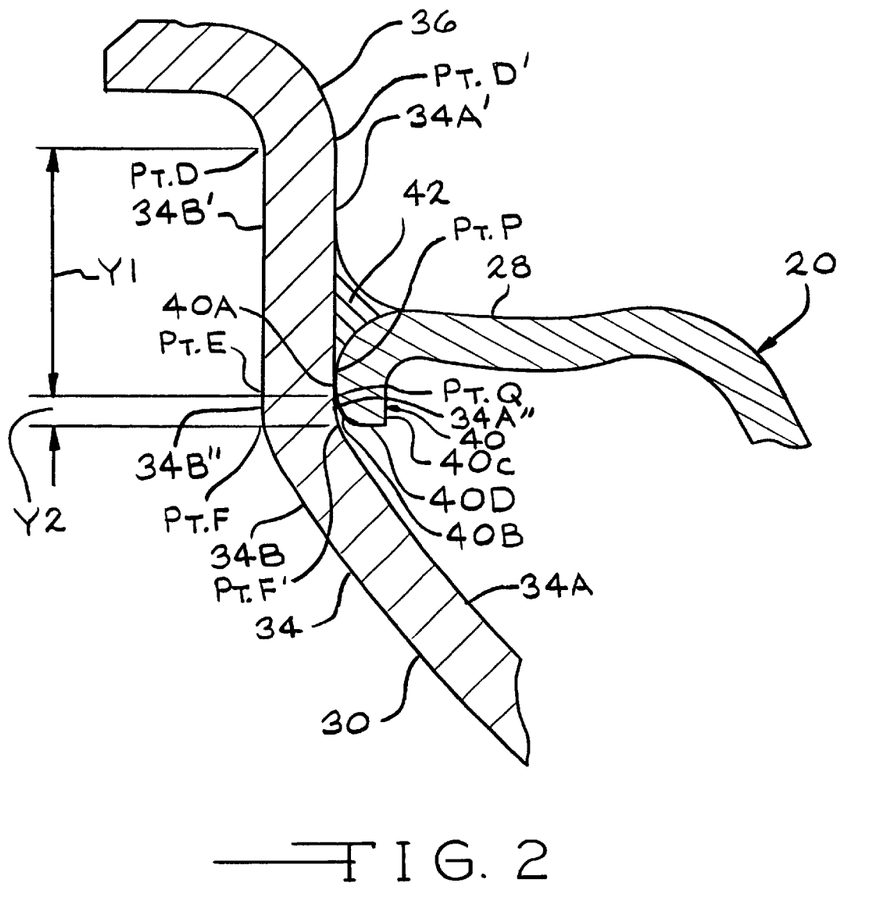
FIG. 2 is an enlarged cross-sectional view of a portion of the wheel illustrated in FIG. 1 and showing a weld joint geometry for joining the wheel rim to the wheel disc to produce the full face vehicle wheel.
Figure 3:
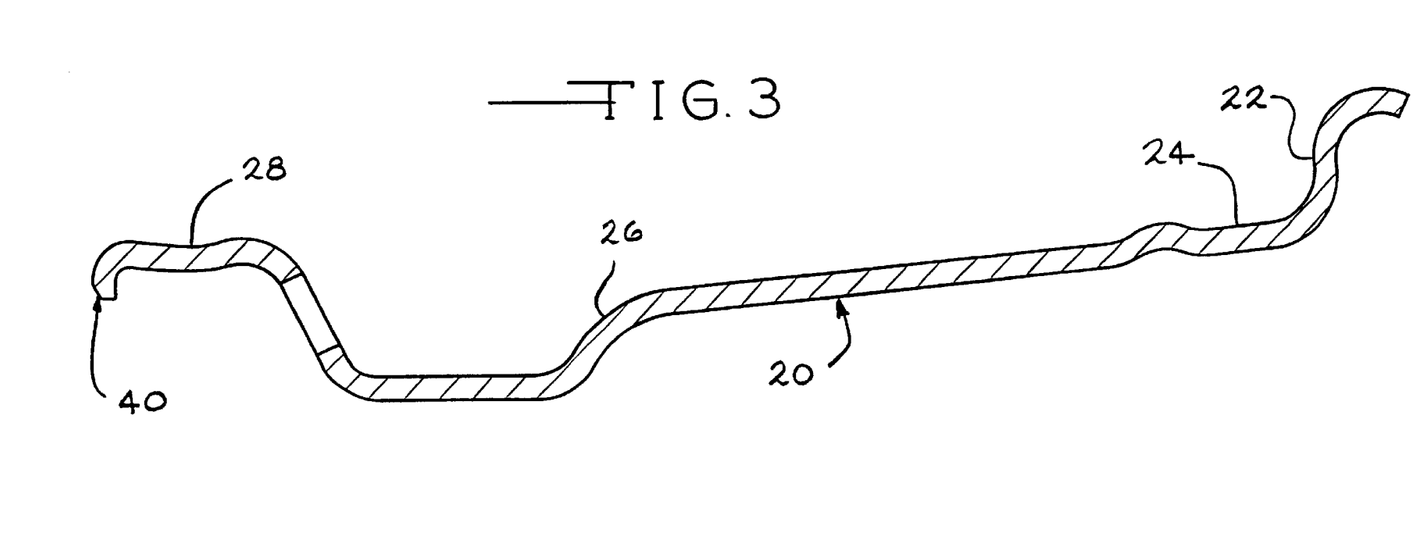
FIG. 3 is a cross-sectional view of the wheel rim shown illustrated in FIGS. 1 and 2.

The outer annular portion 34 of the wheel disc 30 includes an inner surface 34A and an outer surface 34B. As will be wheel discussed below, the inner surface 34A of the flange 34 defines a generally flat "fit-up" surface for receiving the radially inwardly extending outer control surface 40A of the wheel rim flange 40. Preferably, as shown in FIG. 2, the fit-up surface extends from about a point P to about a point Q and generally corresponds to the profile of the curled outer surface 40A of the wheel rim 20. The fit up surface is formed by a suitable method, such as for example, by a machining operation or a stamping operation, to precise dimensions. The outer annular portion 34 of the wheel disc 30 defines a generally flat outer surface 34B' which extends in a generally radial direction from approximately a point D to approximately a point E to define a radial length Y1, and a generally flat inner surface 34A' which extends in a generally radial direction from approximately a point D' to approximately the point Q. The outer annular portion 34 further defines a generally non-radially extending non-flat or curved outer surface 34B" which extends in a non-radial direction from approximately the point E to approximately the point F, and a generally non-radially extending non-flat or curved inner surface 34A" which extends from approximately the point Q to approximately a point F'. As shown in this embodiment in FIG. 2, the surface 40B is slightly spaced from a portion of the surface 34A"; however, the surface 40B could contact the surface 34A" along the entire portion thereof or not contact any portion of the surface 34A" if desired.

To assemble the vehicle wheel 10, the radially inwardly extending flat control surface 40A of the inturned flange 40 of the wheel rim 20 is positioned against the flat inner fit-up surface 34A of the outer annular portion 34 of the wheel disc 30 and a weld 42 is used to join the wheel rim 20 and the wheel disc 30 together and produce the full face fabricated vehicle wheel 10.

Turning now to FIGS. 5–10, the method for producing the wheel rim 30 for use in the vehicle wheel 10 of the present invention will be discussed. Initially in step 100, a welded generally cylindrical hoop or band (not shown) formed from a suitable material, such as for example, steel, aluminum, alloys thereof, is subjected to an expanding and flaring operation to produce a wheel rim preform 120 shown in FIG. 5. As shown therein, an inboard end 120A of the wheel rim preform 120 is flared upwardly during step 100 by a plurality of die members 150 and 152.

Figure 6:
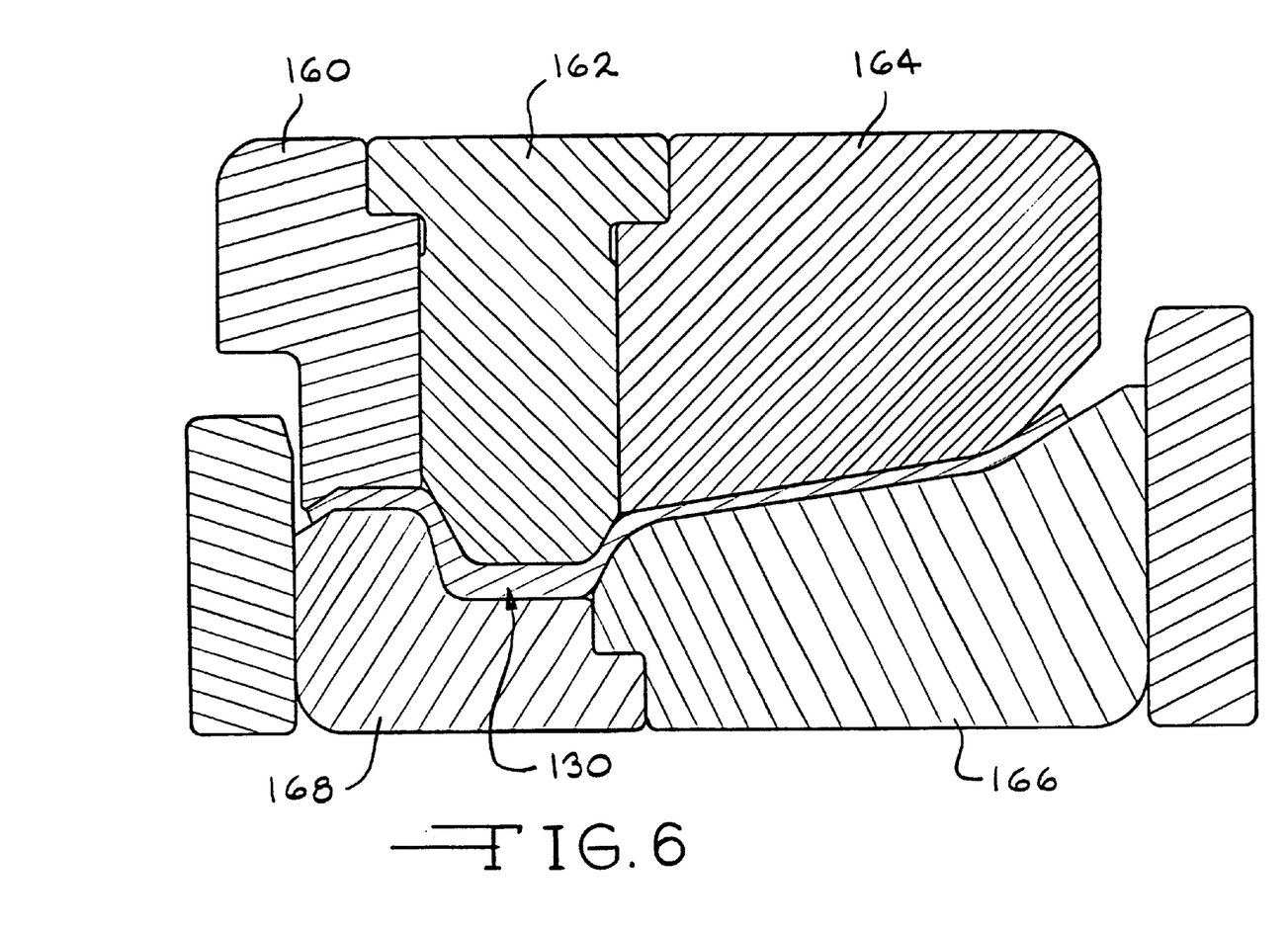
FIG. 6 is a cross sectional view showing an initial roll operation of the flared disc blank into a partially formed wheel rim in accordance with the present invention.
Figure 7:
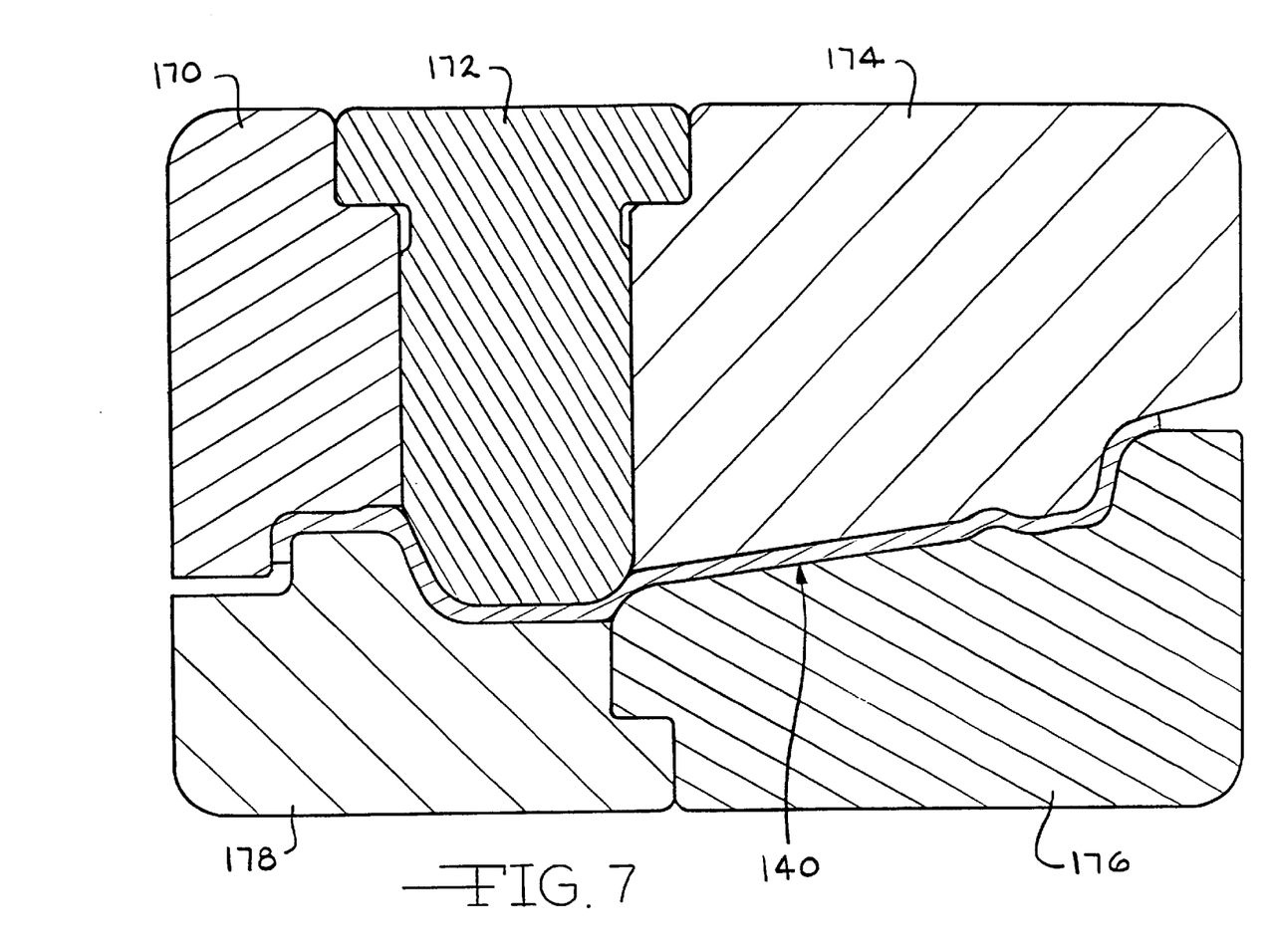
FIG. 7 is a cross sectional view showing an intermediate roll operation of the wheel rim into a partially formed wheel rim in accordance with the present invention.

Following this, in step 102, the wheel rim preform 120 is subjected to an initial metal forming operation to produce a partially formed wheel rim 130 as shown in FIG. 6. As shown therein, the wheel rim preform 120 is supported and engaged by a plurality of die members 160, 162, 164, 166, and 168 during step 102 so as to cause the initial shaping of the wheel rim preform 120 into the desired final wheel rim profile (shown in FIGS. 1–4 and 9). Next, in step 104, the partially formed wheel rim 130 is subjected to an intermediate metal forming operation to produce a partially formed wheel rim 140 as shown in FIG. 7. As shown therein, the partially formed wheel rim 130 is supported and engaged by a plurality of die members 170, 172, 174, and 176 during step 104.

Figure 8:
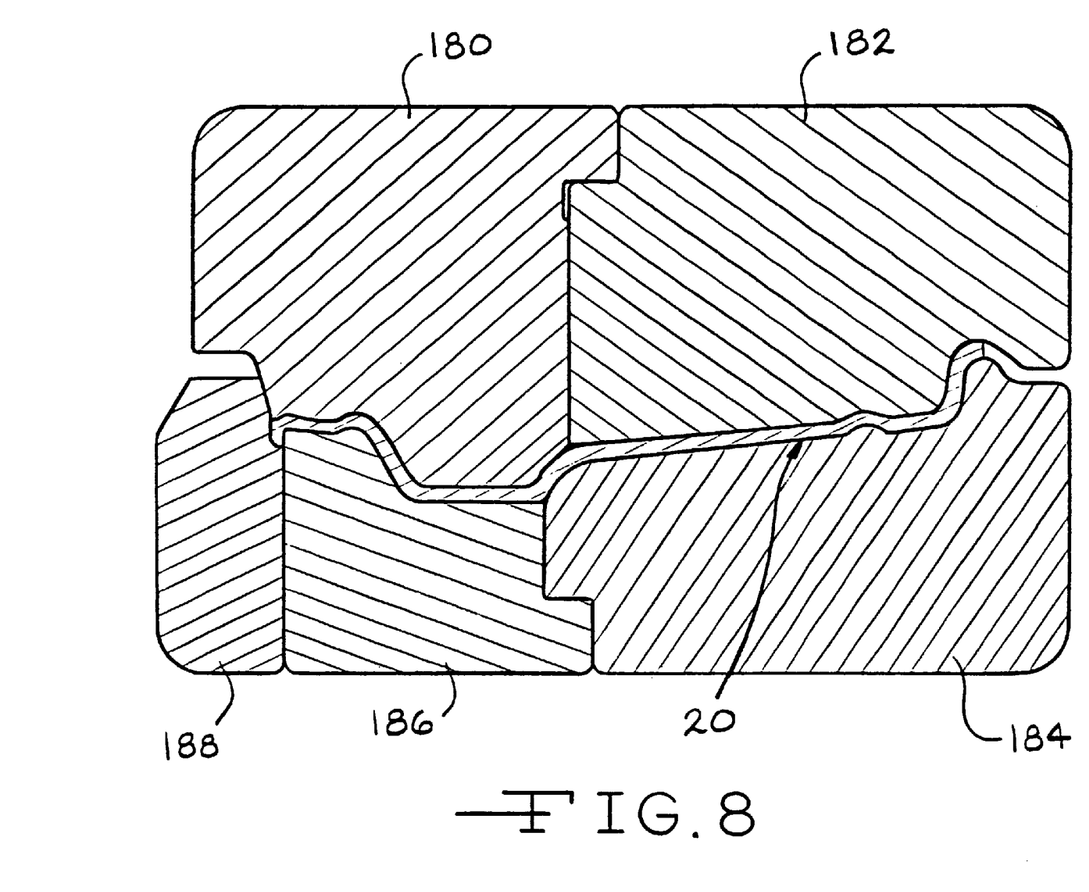
FIG. 8 is a cross sectional view showing a final roll operation of the wheel rim into a fully formed wheel rim in accordance with the present invention.
Figure 9:
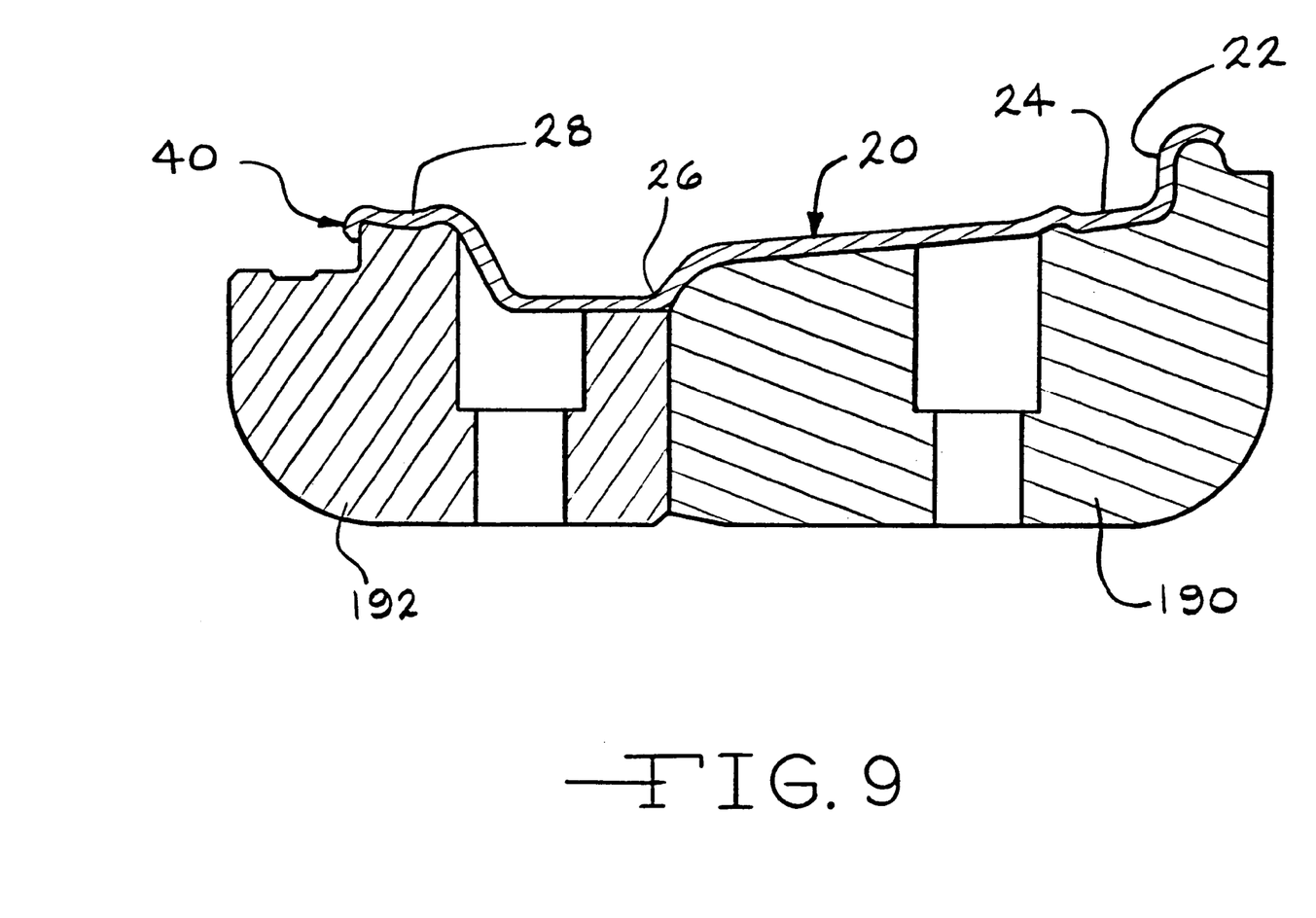
FIG. 9 is a cross sectional view showing an expanding operation of the fully formed wheel rim into the finished wheel rim in accordance with the present invention.
Figure 10:
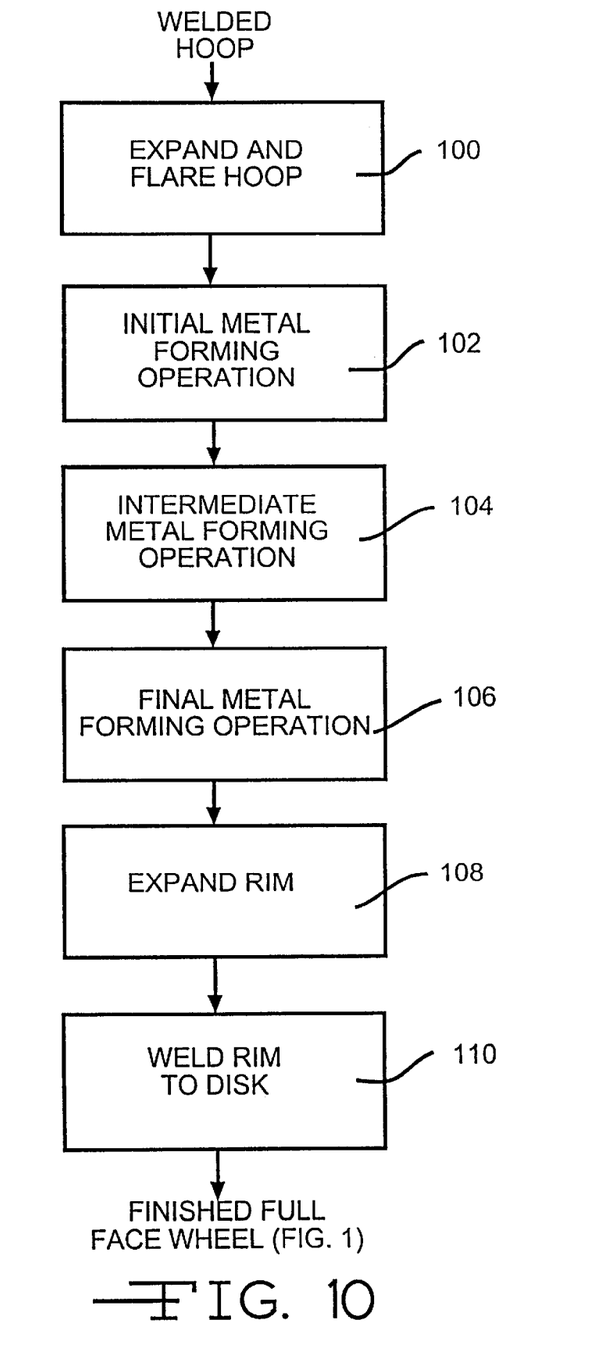
FIG. 10 is a block diagram showing a sequence of steps for producing the wheel in accordance with the present invention.

As shown in FIG. 8, the partially formed wheel rim 140 is subjected to a final metal forming operation to produce the wheel rim 20 during step 106. To accomplish this, the partially formed wheel rim 140 is supported and engaged by a plurality of die members 180, 182, 184, 186, and 188 during step 106. In particular, as shown on the left side of FIG. 8, the outboard end of the partially formed wheel rim 140 is engaged by the die members 180 and 188 which are operative to form the extruded inturned flange 40. Following this, in step 108, the wheel rim 20 is subjected to a final expanding operation as shown in FIG. 9 to produce the finished wheel rim 20. As shown in FIG. 9, during step 108 the wheel rim 20 is expanded by die members 190 and 192. Although the series of metal forming operations of steps 100–108 have been illustrated and described as preferably being die forming operations, other metal forming operations can be used in one or more of the steps 100–108 if desired. Other suitable metal forming operations can include, for example, forward or reverse flow spinning operations, roll forming operations, pressing operations, or any suitable combinations of roll forming, flow spinning, and pressing operations which are operative to cause deformation, reshaping, and/or thinning of the metal to produce the wheel rim 20 having the desired profile. In step 110, the wheel rim 20 is secured to the preformed full face wheel disc 30 by welding to produce the finished full face vehicle wheel 10.

Figure 11:
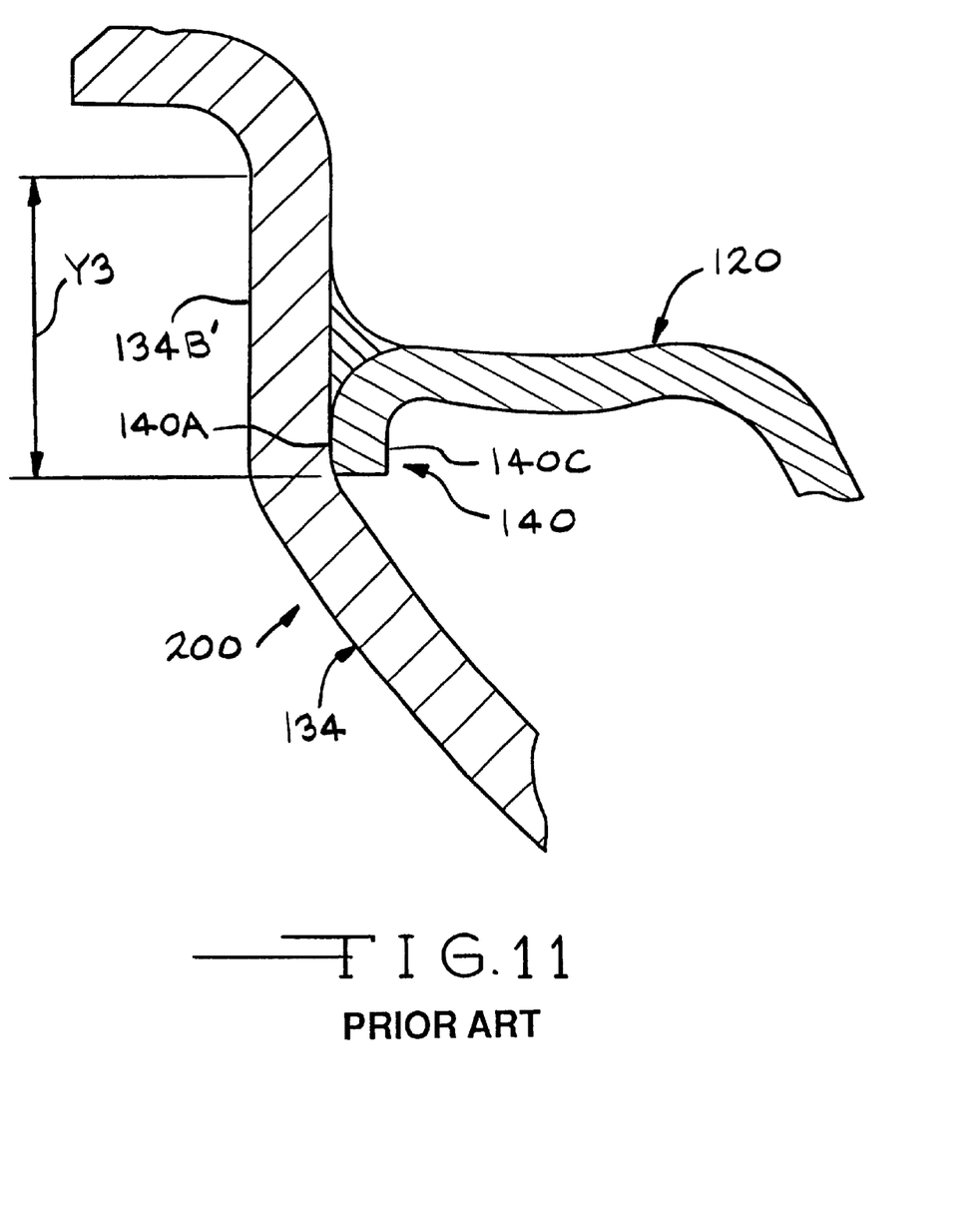
FIG. 11 is a cross sectional view showing a portion of a prior art full face vehicle wheel.

By forming the curled surface 40B in the inturned flange 40 of the wheel rim 20 of the present invention, the length Y1 of the generally outer flat surface 34B' in the outer annular portion 34 of the wheel disc 30 is reduced compared to a length Y3 defined by an generally outer flat surface 134B' in an outer annular portion 134' of a prior art wheel disc 130 of a similar sized prior art full face vehicle wheen 200, as shown in FIG. 11. Thus, it can be seen that the length Y3 is the sum of the distance Y1 and Y2. As shown in FIG. 11, the prior art vehicle wheel 132 includes a wheel rim 120 having an inturned flange 140 which defines a generally radially extending outer surface 140A and a generally radially extending outer surface 140C which is generally parallel to the outer surface 140A so as to define a generally constant thickness throughout the entire length thereof. In addition, in the present invention, since the inturned flange 40 of the wheel rim 20 includes an inner surface 40C and the radially inwardly extending curled outer surface 40B, a non-constant thickness is defined in a portion thereof. Alernatively, the inner surface 40C of the inturned flange 40 of the wheel rim 20 of the present invention could be formed so as to extend generally parallel to outer surface 40A and the radially inwardly extending curled outer surface 40B(or 40B') so as to define a generally constant thickness throughout the entire length thereof, as shown in phantom in FIG. 4 at 40C'.

One advantage of this invention is that the curled outer surface 40B in the flange 40 of the wheel rim 20 improves the styling of the associated full face wheel 10 by reducing the radial length Y1 of the generally flat outer surface 34B' in the outer annular portion 34 of the wheel disc 30. This is illustrated by comparing the radial length Y1 of the flat outer surface 34B' of the wheel disc 30 of the full face vehicle wheel 10 of this invention as shown in FIG. 2 to the radial length Y3 defined by the flat outer surface 134B' of the prior art wheel 130 of the prior art full face vehicle wheel 200 as shown in prior art FIG. 11.

What is claimed is:

1. A full face vehicle wheel comprising:
   a wheel disc including a body having a centrally located wheel mounting surface and an outer annular portion, said outer annular portion defining an outboard tire bead seat retaining flange of said full face vehicle wheel, said outer annular portion including an outer surface and an inner surface, said outer surface of said outer annular portion defining a generally radially extending outer surface in the region of said outboard tire bead seat retaining flange, said inner surface of said outer annular portion defining a generally radially extending inner fit up surface, said outer annular portion further including a generally non-radially extending inner surface spaced directly inwardly of said radially extending inner fit up surface; and
   a wheel rim joined to said wheel disc and defining an axis, said wheel rim including an inboard tire bead seat retaining flange, an inboard tire bead seat, an axially extending well, and an outboard tire bead seat, said outboard tire bead seat terminating at an extruded inturned flange, said extruded inturned flange including a generally radially inwardly extending first outer surface, a generally non-radially extending second outer surface, an inner surface, and an endmost surface, said radially inwardly extending first outer surface defining an outer control surface, said non-radially extending second outer surface disposed between said radially inwardly extending first outer surface and said endmost surface, and said extruded inturned flange having a generally non-constant thickness throughout an outer end portion thereof;
   wherein when said outer control surface of said wheel rim is positioned adjacent said inner fit up surface of said wheel disc and said wheel disc and said wheel rim are joined together by a weld, said non-radially extending second outer surface of said extruded inturned flange contacting at least a portion of said non-radially extending inner surface of said wheel disc thereby reducing a radial distance of said radially extending outer surface of said wheel disc in the region of said outboard tire bead seat retaining flange.

2. The full face vehicle wheel defined in claim 1 wherein said non-radially extending second outer surface extends generally non-parallel to said radially inwardly extending inner surface so as to define a generally non-constant thickness throughout said outer end portion of said extruded inturned flange.

3. The full face vehicle wheel defined in claim 1 wherein said non-radially extending second outer surface extends generally parallel to said radially inwardly extending inner surface so as to define a generally non-constant thickness throughout an entire length of said extruded inturned flange.

4. The full face vehicle wheel defined in claim 1 wherein said non-radially extending second outer surface of said extruded inturned flange is a generally non-flat outer surface.

5. The full face vehicle wheel defined in claim 1 wherein said non-radially extending second outer surface of said extruded inturned flange is a generally flat outer surface.

6. The full face vehicle wheel defined in claim 1 wherein said fit-up surface and said control surface are generally flat surfaces.

7. The full face vehicle wheel defined in claim 1 wherein said radially inwardly extending first outer surface of said extruded inturned flange defines a first radial distance, said non-radially extending second outer surface of said extruded inturned flange defines a second radial distance which is generally about equal to said first radial distance.

8. The full face vehicle wheel defined in claim 1 wherein said endmost surface of said extruded inturned flange is a generally flat axially extending endmost surface.

9. A full face vehicle wheel comprising:
   a wheel disc including a body having a centrally located wheel mounting surface and an outer annular portion, said outer annular portion defining an outboard tire bead seat retaining flange of said full face vehicle wheel, said outer annular portion including an outer surface and an inner surface, said outer surface of said outer annular portion defining a generally radially extending outer surface in the region of said outboard tire bead seat retaining flange, said inner surface of said outer annular portion defining a generally radially extending inner fit up surface, said outer annular portion further including a generally non-radially extending inner surface spaced directly inwardly of said radially extending inner fit up surface; and a wheel rim joined to said wheel disc and defining an axis, said wheel rim including an inboard tire bead seat retaining flange, an inboard tire bead seat, an axially extending well, and an outboard tire bead seat, said outboard tire bead seat terminating at an inturned flange, said extruded inturned flange including a first outer surface, a second outer surface, an inner surface, and an endmost surface, said first outer surface defining an outer control surface, said second outer surface disposed between said first outer surface and said endmost surface, and said inturned flange having a generally non-constant thickness throughout and outer end portion thereof;

wherein when said outer control surface of said wheel rim is positioned adjacent said inner fit up surface of said wheel disc and said wheel disc and said wheel rim are joined together by a weld, said second outer surface of said extruded inturned flange contacting at least a portion of said non-radially extending inner surface of said wheel disc. flange having a generally non-constant thickness throughout an outer end portion thereof;

wherein when said outer control surface of said wheel rim is positioned adjacent said inner fit up surface of said wheel disc and said wheel disc and said wheel rim are joined together by a weld, said second outer surface of said extruded inturned flange contacting at least a portion of said non-radially extending inner surface of said wheel disc.

10. The full face vehicle wheel defined in claim 9 wherein said first outer surface is a generally radially inwardly extending first outer surface and said second outer surface is a generally non-radially extending second outer surface.

11. The full face vehicle wheel defined in claim 9 wherein said second outer surface extends generally non-parallel to said inner surface so as to define a generally non-constant thickness throughout said outer end portion of said extruded inturned flange.

12. The full face vehicle wheel defined in claim 1 wherein said second outer surface extends generally parallel to said inner surface so as to define a generally non-constant thickness throughout an entire length of said extruded inturned flange.

13. A method for producing a full face vehicle wheel comprising the steps of:

(a) providing a wheel disc including a body having a centrally located wheel mounting surface and an outer annular portion, the outer annular portion defining an outboard tire bead seat retaining flange of the full face vehicle wheel and including an outer surface and an inner surface, the outer surface of the outer annular portion defining a generally radially extending outer surface in the region of the outboard tire bead seat retaining flange, the inner surface of the outer annular portion defining a generally radially extending inner fit up surface, the outer annular portion further including a generally non-radially extending inner surface spaced directly inwardly of the radially extending inner fit up surface;

(b) providing an extruded wheel rim defining an axis and including an inboard tire bead seat retaining flange, an inboard tire bead seat, an axially extending well, and an outboard tire bead seat, the outboard tire bead seat terminating at an extruded inturned flange, the extruded inturned flange including a generally radially inwardly extending first outer surface, a generally non-radially extending second outer surface, an inner surface, and an endmost surface, the radially inwardly extending first outer surface defining an outer control surface, the non-radially extending second outer surface disposed between the radially inwardly extending first outer surface and the endmost surface, and the extruded inturned flange having a generally non-constant thickness throughout an outer end portion thereof;

(c) positioning the outer control surface of the wheel rim adjacent the inner fit up surface of the wheel disc wherein the non-radially extending second outer surface of said extruded inturned flange contacts at least a portion of the non-radially extending inner surface of said wheel disc thereby reducing a radial distance of the radially extending outer surface of the wheel disc in the region of the outboard tire beat seat retaining flange; and (d) securing the wheel disc to the wheel rim with a weld.

14. The method according to claim 13 wherein the inner surface of the extruded inturned flange is a generally radially inwardly extending inner surface and said non-radially extending second outer surface of the extruded inturned flange extends generally non-parallel to the radially inwardly extending inner surface of the extruded inturned flange so as to define a generally non-constant thickness throughout the outer end portion of the extruded inturned flange.

15. The method according to claim 13 wherein said the surface of the extruded inturned flange is a generally non-radially extending inner surface and the non-radially extending second outer surface of the extruded inturned flange extends generally parallel to the radially inwardly extending inner surface of the extruded inturned flange so as to define a generally non-constant thickness throughout an entire length of the extruded inturned flange.

16. The method according to claim 13 wherein the non-radially extending second outer surface of the extruded inturned flange is a generally non-flat outer surface.

17. The method according to claim 13 wherein the non-radially extending second outer surface of the extruded inturned flange is a generally flat outer surface.

18. The method according to claim 13 wherein the fit-up surface and the control surface are generally flat surfaces.

19. The method according to claim 13 wherein the radially inwardly extending first outer surface of said the extruded flange defines a first radial distance, the non-radially extending second outer surface of the extruded inturned flange defines a second radial distance which is generally about equal to the first radial distance.

20. The method according to claim 13 wherein the endmost surface of the extruded inturned flange is a generally flat axially extending endmost surface.

* * * * *